D. W. KOLLE.
FASTENING.
APPLICATION FILED FEB. 18, 1914.
1,110,211.
Patented Sept. 8, 1914.
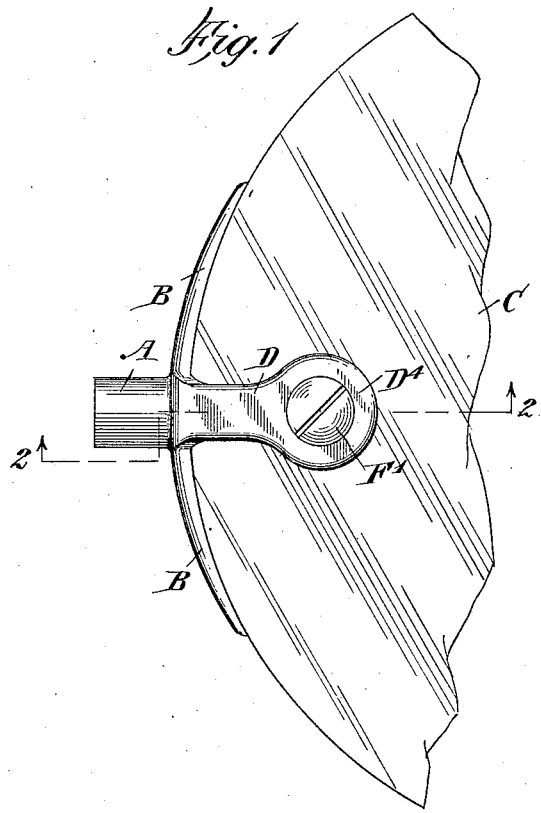
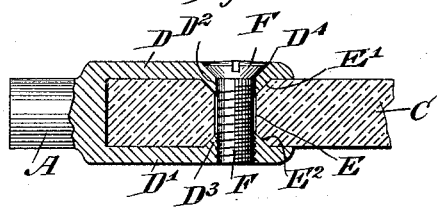
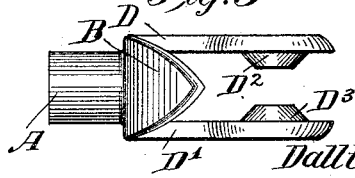
WITNESSES
INVENTOR
Dalltor Waldemar Kolle
BY
ATTORNEYS
THE NORRIS PETERS CO., PHOTO-LITHO., WASHINGTON, D. C.

UNITED STATES PATENT OFFICE.

DALLTOR WALDEMAR KOLLE, OF PORTLAND, OREGON.

FASTENING.

1,110,211.  Specification of Letters Patent.  Patented Sept. 8, 1914.

Application filed February 18, 1914. Serial No. 819,462.

*To all whom it may concern:*

Be it known that I, DALLTOR WALDEMAR KOLLE, a citizen of the United States, and a resident of Portland, in the county of Multnomah and State of Oregon, have invented a new and Improved Fastening, of which the following is a full, clear, and exact description.

The invention relates to eyeglasses and spectacles, and its object is to provide a new and improved fastening more especially designed for fastening the posts or studs to lenses of eyeglasses and spectacles, and arranged to securely hold the lens in position on the post by the use of a screw holder out of contact with the lens.

In order to produce the desired result, use is made of a post having apertured ears straddling the lens and provided at their inner faces with frusto-conical flanges extending into ends of an aperture in the lens, one of the said ears and its flange being provided with an interior screw thread and a screw engaging the said ears and passing through the said apertures of the lens.

A practical embodiment of the invention is represented in the accompanying drawings forming a part of this specification, in which similar characters of reference indicate corresponding parts in all the views.

Figure 1 is an enlarged face view of the fastening device as applied for fastening the post or stud to a lens; Fig. 2 is an inverted sectional plan view of the same on the line 2—2 of Fig. 1; and Fig. 3 is an edge view of the post or stud.

The post or stud is provided with the usual strap B fitting onto the peripheral edge of the lens C and the said post or stud is also provided with ears D, D' straddling the lens C by engaging the opposite faces thereof. The ears D, D' are provided with registering apertures in register with an aperture E formed in the lens C, and the ends of the said aperture E are provided with countersinks E, E' into which fit frusto-conical annular flanges $D^2$, $D^3$ integral on the inner faces of the ears D and D'. The wall of the aperture in the ear D' is provided with an interior screw-thread into which screws a screw F passing through the nonthreaded aperture in the ear D and its flange $D^2$, the said ear D being provided with a countersink $D^4$ into which fits the head F' of the screw F so that the head F' does not form an undesirable projection. It will be noticed that by having the flanges $D^2$, $D^3$ engaging the countersinks E', $E^2$, the ears D and D' are properly centered relatively to the aperture E, and at the same time the flanges $D^2$, $D^3$ draw the strap B in firm contact with the peripheral edge of the lens C so that the post or stud A is securely fastened in place and is not liable to break the lens. It will also be noticed that the screw F does not come in contact with the wall of the aperture E and hence the screw cannot work loose and is not liable to break the lens C as is so often the case with fastenings of this kind.

The fastening shown and described is very simple in construction, and can be readily applied to the lens C, it being understood that in placing the ears D, D' in position on the lens C, the ears are slightly spread apart to pass over the surfaces of the lens until the flanges $D^2$ and $D^3$ snap into the countersinks E' and $E^2$ at the ends of the apertures E.

Having thus described my invention, I claim as new and desire to secure by Letters Patent:

In a fastening, the combination of a lens provided with a round aperture having conical countersunk ends, a post provided with apertured ears straddling the said lens, the inner faces of the said ears being provided with frusto-conical flanges fitting into the said countersunk ends of the lens aperture, one of the said ears and its flange being provided with an interior screw thread and the other ear being apertured and countersunk at its outer face, and a screw passing through the countersunk apertured ear with its head in the countersink, loosely through the aperture of the lens and screwing into the threaded ear.

In testimony whereof I have signed my name to this specification in the presence of two subscribing witnesses.

DALLTOR WALDEMAR KOLLE.

Witnesses:
BURTON THURBER,
M. NEVILLE.